Figure 1:
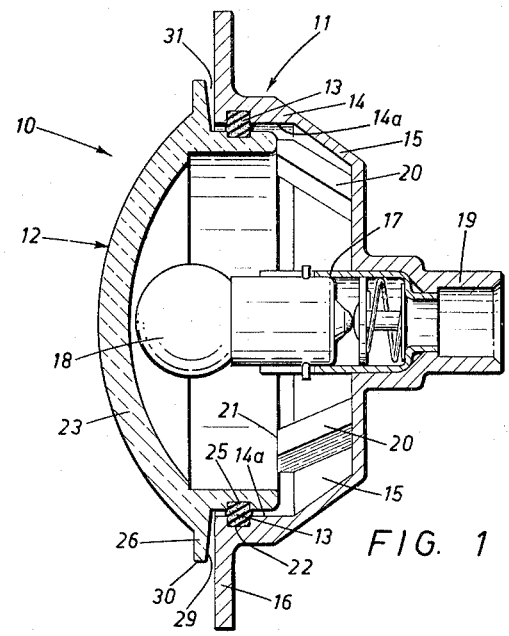

April 5, 1966　　　　D. E. BUCK　　　　3,244,869

VEHICLE LAMP

Filed March 23, 1964

David E. Buck
INVENTOR.

BY

Attorney

United States Patent Office 3,244,869
Patented Apr. 5, 1966

3,244,869
VEHICLE LAMP
David E. Buck, Willowdale, Ontario, Canada, assignor to Dominion Auto Accessories Limited, Toronto, Ontario, Canada
Filed Mar. 23, 1964, Ser. No. 353,976
1 Claim. (Cl. 240—7.1)

This invention relates to a vehicle lamp, and more particularly, to a vehicle lamp which may be employed advantageously as a clearance or marker lamp, for example, on all types of trucks, including tank trucks used to transport inflammable materials such as gasoline and oil.

A vehicle lamp of the same general type to which this invention relates is commercially available, but this prior art vehicle lamp differs in a number of material aspects from a vehicle lamp embodying this invention, and it is in the structural differences, and the disadvantages overcome and the advantages gained that this invention resides.

Thus, in the aforementioned prior art vehicle lamp, both the lens and the housing are provided with annular grooves of semi-circular cross-section, each of which is adapted to accommodate a part of an O-ring of resilient material and rounded cross-section. The disadvantage of this arrangement is that it is difficult to compress an O-ring of circular cross-section into an opening which also is of circular cross-section, and this contributes material resistance to the assembly and disassembly of the lens, housing and O-ring.

In accordance with this invention, the annular grooves in the lens and housing are made rectangular in cross-section, so as to provide space into which an O-ring of rounded cross-section can expand, thus facilitating the assembly and disassembly of the lens and housing.

In the aforementioned prior art vehicle lamp the lens is provided with an exterior flange which abuts against an exterior flange on the housing when the lens is correctly positioned on the housing. Such a construction requires that the lens be moulded with space-apart openings in the lens flange between this flange and the housing flange, so that a screwdriver can be inserted into these openings to lever up the lens. From time to time these openings may become filled with sand and other road dirt making it difficult to insert a screwdriver into these openings, and these openings also may be difficult to locate when it is desired to replace a burnt-out light bulb on a dark night.

In accordance with this invention, the flange on the lens is spaced from the flange on the housing when the lens is correctly positioned on the housing, so that there is an opening between the two flanges all of the way around the lens. Road dirt can be readily removed from such an opening, and a screwdriver or similar device can be inserted between the two flanges at any position.

In brief, in accordance with this invention there is provided a vehicle lamp which comprises a housing, a lens, and means for connecting the housing and lens together in sealed relationship. The housing has side walls which define a generally dished portion open at one side thereof. A first annular flange extends around the open side of the dished portion, and a first annular groove of generally rectangular cross-section is provided in the side walls and opens into the dished portion. The lens comprises a light-penetratable part which is adapted to be positioned from the open side of the housing, a second annular flange which projects from the light-penetratable part and of a diameter less than the diameter of the dished portion at and adjacent to the open side thereof, a third annular flange which extends around the periphery of the light-penetratable part, and a second annular groove of generally rectangular cross-section in the second annular flange. The means for connecting the lens and the housing together comprises a ring of resilient material and rounded cross-section.

The lens is adapted to be positioned on the housing with the light-penetratable part thereof positioned from the open side of the housing, with the second flange projecting into the dished portion, with the first and second grooves being aligned with and facing each other, with the ring being positioned in the first and second grooves and compressed therein, and with the third flange overlying the first flange. The surface of the third flange which is adjacent to the first flange when the lens is so positioned on the housing is spaced from the first flange.

Figure 2:
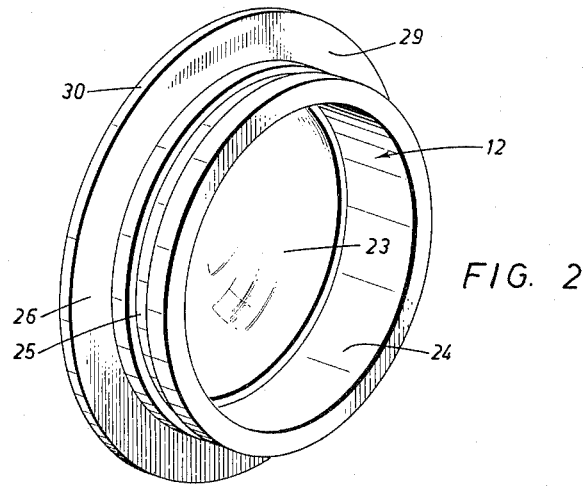

Referring to FIGURE 1, there is shown a vehicle lamp 10 which comprises a housing 11, a lens 12 (see also FIG. 2) and an O-ring 13 for connecting the lens and housing together in sealed relationship.

Housing 11 is generally cup-shaped and has side walls 14 which define a generally dished portion 15 which is open at one side thereof. Extending around the open side of dished portion 15 and formed integral with side walls 14 is an annular flange 16.

Positioned within housing 11 and suitably affixed thereto is a socket 17 for an electric light bulb 18. Wires (not shown) may be connected to the electrical contacts (not shown) of socket 17 through a nipple 19 formed integral with and extending from side walls 14. Preferably the opening in nipple 19 is suitably sealed to prevent air or other vapor from entering into housing 11. Also positioned within housing 11 and formed integral with side walls 14 are three, spaced-apart ribs 20, only two of which are shown, the ends 21 of which constitute stops, as will become more apparent hereinafter. Formed in side walls 14 adjacent the open side of dished portion 15 and opening into dished portion 15 is an annular groove 22 of rectangular cross-section.

Housing 11 and the aforementioned appendages preferably are formed from a corrosion-resistant metal by a casting operation, and the interior surface of side walls 14 preferably is highly light reflective.

Lens 12 is formed from plastic or other suitable transparent or translucent material and may be suitably coloured. Lens 12 is disc-shaped in plan and has a light-penetratable part 23 which is shaped in the form of a part of a sphere. Formed integral with part 23 is an annular flange 24 which is parallel to the axis of lens 12. It will be seen that an annular groove 25 of rectangular cross-section is provided in flange 24.

Lens 12 has another annular flange 26 which also is formed integral with part 23 and extends around the periphery thereof.

O-ring 13 preferably is of circular cross-section when unstressed and is fabricated from any suitable resilient, deformable material such as rubber, for example. O-rings per se are well known, of course.

Preferably one of grooves 22 and 25 is made deeper than the other to form a permanent housing for O-ring 13 when lens 12 and housing 11 are disassembled. It is preferred that groove 22 be deeper than groove 25, so that O-ring 13 will remain with housing 11 when lens 12 is removed therefrom.

In order to mount a lamp embodying this invention on a panel having an opening therein, housing 11 is inserted into the opening until flange 16 abuts the panel and lamp 10 then is secured to the panel by means of screws (not shown) or the like passing through flange 16 into the panel.

In order to assemble lens 12, housing 11 and O-ring 13, the O-ring is placed in groove 22 which is deeper than groove 25. Flange 24, which, when the lens and lamp are assembled, is parallel to part 14a of side walls 14, then is inserted into dished portion 15, which results in O-ring 13 being compressed between flange 24 and groove 22. When flange 24 abuts stops 21, grooves 22 and 25 are aligned with each other, as shown, and O-ring 13 expands into groove 25. However, when O-ring 13 is positioned in grooves 22 and 25, it is still deformed and under compression, so that a tight seal is effected between lens 12 and housing 11.

As best seen in FIGURE 1, when flange 24 abuts stops 21, there is a clearance between the surface 29 of flange 26 adjacent to flange 16 and this latter flange. Furthermore, the whole of surface 29 is inclined at an acute angle to flange 16 in such a manner that the part thereof adjacent the peripheral edge 30 of lens 12 is furthest from flange 16, while the part thereof closest to flange 24 is closest to flange 16. In this manner there is an opening 31 which extends completely around the lamp between the lens and the housing to facilitate removal of the lens from the housing by means of a screwdriver or similar instrument.

While preferred embodiments of this invention have been disclosed herein, those skilled in the art will appreciate that changes and modifications may be made to this invention without departing from the spirit and scope thereof as defined in the appended claim.

The embodiments of the invention in which an exclusive property or privilege is claimed are defined as follows:

A vehicle lamp comprising a housing, a lens, and means for connecting said lens and said housing together in sealed relationship; said housing having side walls defining a generally dished portion open at one side thereof, a first annular flange extending around the open side of said dished portion, and a first annular groove of generally rectangular cross-section in said side walls and opening into said dished portion; said lens comprising a light-penetrable part adapted to be positioned over the open side of said housing, a second annular flange projecting from said light-penetrable part and of a diameter less than the diameter of said dished portion at and adjacent to the open side thereof, a third annular flange extending around the periphery of said light-penetrable part, and a second annular groove of generally rectangular cross-section in said second annular flange; said means for connecting said lens and said housing together in sealed relationship comprising a ring of resilient material and rounded cross-section; said lens being adapted to be positioned on said housing with said light-penetrable part being positioned over the open side of said housing, with said second flange projecting into said dished portion, with said first and second grooves being aligned with and facing one another, with said ring being positioned in said first and second grooves and compressed therein, and with said third flange overlying said first flange; the housing including within said dished portion stop means against which said second flange abuts when the lens is so positioned on said housing; the surface of said third flange adjacent said first flange being at all points spaced from, and diverging outwardly away from, said first flange when the lens is so positioned.

References Cited by the Examiner

UNITED STATES PATENTS

| | | | |
|---|---|---|---|
| 2,102,029 | 12/1937 | Putterman | 240—41.55 |
| 2,707,747 | 5/1955 | De Frees | 240—41.55 X |
| 2,730,611 | 1/1956 | Black | 240—41.55 X |
| 3,093,320 | 6/1963 | Knapp | 240—8.2 |
| 3,125,299 | 3/1964 | Woofter et al. | 240—7.1 |
| 3,145,933 | 8/1964 | Dickson | 240—41.55 X |

FOREIGN PATENTS 1,167,201  7/1958  France.

NORTON ANSHER, *Primary Examiner.*

J. F. PETERS, *Assistant Examiner.*